April 1, 1969 G. P. HOUCKE ET AL 3,436,479
CHECK CIRCUIT FOR COMPARING THE INPUT AND OUTPUT OF DATA REPEATERS
Filed April 11, 1966
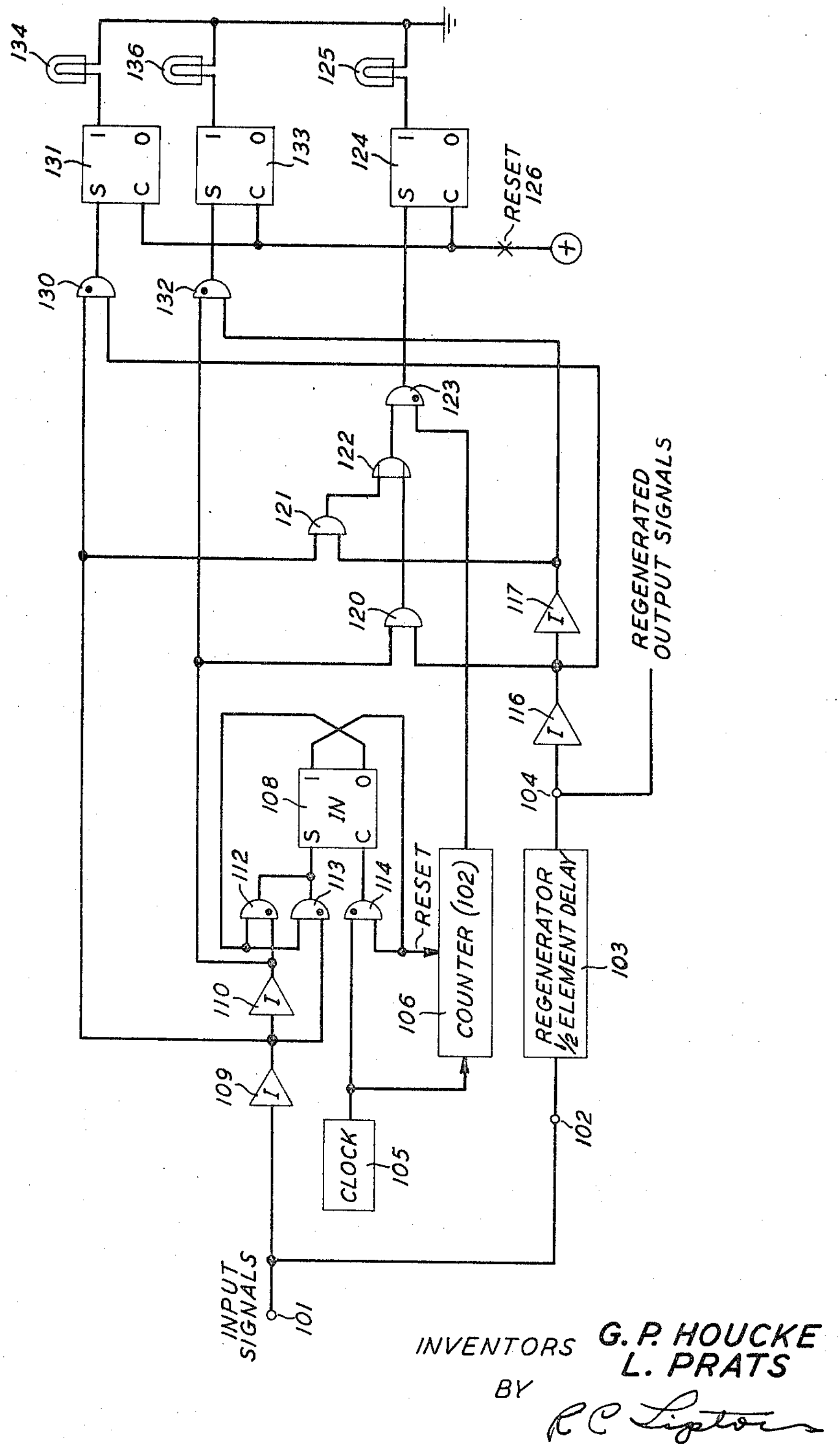
INVENTORS G. P. HOUCKE
L. PRATS
BY R C Lipton
ATTORNEY United States Patent Office 3,436,479

Patented Apr. 1, 1969

3,436,479

CHECK CIRCUIT FOR COMPARING THE INPUT AND OUTPUT OF DATA REPEATERS

George P. Houcke, Tenafly, N.J., and Louis Prats, Queens Village, N.Y., assignors to Bell Telephone Laboratories, Incorporated, New York, N.Y., a corporation of New York Filed Apr. 11, 1966, Ser. No. 541,775
Int. Cl. H04l 25/02, 25/20; H03k 5/20
U.S. Cl. 178—69 4 Claims This invention relates to circuits for checking the output of binary data and telegraph repeaters and, more particularly, to check circuits for comparing the input and output of regenerative repeaters.

It is a broad object of this invention to provide a check of a data repeater output by comparing the output with the input data.

It is another object of this invention to compare two data signal trains.

Electronic regenerative repeaters of binary data signals sample each mark and space information bit or element at the theoretical midpoint and regenerate the element free of distortion. The output, however, has a resultant delay of half an element with respect to the input.

To provide a check of the repeater operation, the output may be connected to a teletypewriter printer and the resultant printed text compared with the data supplied to the repeater. The printers, however, are expensive and generally do not have the versatility to handle the various synchronous and start-stop character codes and signaling speeds which the repeater can regenerate.

Another method of checking the repeater involves utilizing a companion repeater in parallel. The companion repeater would provide the same inherent relative delay and the ouptuts could be checked with a simple comparator circuit. The companion repeater, however, has the same complexity as the repeater to be checked and is therefore expensive and, in addition, subject to the same incidence of errors.

Accordingly, it is an object of this invention to compare a train of binary signals with a delayed train.

It is a further object of this invention to provide an inexpensive and versatile comparator.

In accordance with the invention, comparison checks of the repeater output are provided in two ways. One detection method compares the repeater output with the incoming signals when two successive like bits occur in the input signal train. The second method checks the repeater output whenever the input signal train makes a transistion. Since comparisons are made for successive like bits and for transistions, a bit by bit check is provided.

It is a feature of this invention that an error indicator is operated in the event that two consecutive like input bits are received and the regenerator output does not compare with the signal input. The sampling is made after a delay slightly exceeding the duration of the first like bit so that, in view of the half element delay of the repeater, a sampling interval at the approximate midpoint of the corresponding output bit is provided.

It is a further feature of this invention that the error indicator is also operated in the event that a signal transition is received and the regenerator output does not compare to the input signal condition prior to the transition. In view of the repeater delay, sampling at the input transition provides a sampling interval at the approximate midpoint of the regenerated output element corresponding to the input bit prior to the transition.

It is an additional feature of this invention that sampling and comparisons are provided by conventional logic circuits.

The foregoing and other objects and features of this invention will be fully understood from the following description of an illustrative embodiment thereof taken in conjunction with the single figure of the accompanying drawing showing an arrangement in schematic form for comparing the signal inputs provided to a regenerative repeater with the delayed output thereof in accordance with the invention.

Before describing the illustrative embodiment of the invention, a brief description of the logic circuits and elements used therein will be given. Referring to the drawing, the circuits therein are shown utilizing positive logic. Each of flip-flops 108, 124, 131, and 133 is provided with two input terminals and two corresponding output terminals. Input terminal S places the flip-flop in the SET condition when a positive-going transition is applied thereto and when in the SET condition the 1 or set output terminal is driven to the positive condition. When a positive transistion is applied to clear input terminal C, however, the flip-flop is driven to the CLEAR condition and the 0 or clear output terminal goes to the positive condition.

The circuit includes AND gates 120 and 121. Each AND gate includes two inputs and is arranged to provide a positive output when both the inputs are in a positive condition. Also included in the circuit is OR gate 22 arranged to provide a positive output when either one of the two inputs goes to the positive condition.

Also shown in the figure are a plurality of pulsing gates such as pulsing gate 112. Each pulsing gate includes two input terminals, one input terminal being adjacent to a dot as shown in the drawing and hereinafter designated as the input pulsing lead. When the other input terminal, hereinafter designated as the enabling lead, has a positive condition applied thereto, the pulsing gate is enabled and passes a positive going transition on the input pulsing lead to the output thereof.

Incoming signals from a data receiver, for example, are applied to input data lead 101. These signals are then passed by way of regenerator input terminal 102 to regenerator 103. Regeneraor 103, as is well known in the art, functions to examine the theoretical midpoint of each data element and in accordance therewih to regenerate and retime the signal element. Accordingly, the data signals applied to output terminal 104 of regenerator 103 comprise data elements having substantially the same form as the data elements as originally generated with the exception that the output signals have a one-half element delay with respect to the signals applied to input terminal 102 of regenerator 103. This delay, of course, is necessary since regenerator 103 examines the midpoint of a data element before initiating the regeneration and retiming of the element. The regenerated output signals on terminal 104 can then be provided, in the conventional manner, to processing or recording equipment, not shown.

The function of the comparator circuit is to check the delayed output signals on terminal 104 with the input signals applied to terminal 102 from input lead 101. One check involves performing a comparison when two successive "mark" or "space" elements are received. In this event there is no input signal change or transition for an interval exceeding an element duration. In accordance therewith flip-flop 108 functions to detect the occurrence of each signal transition and in response thereto reset a timing circuit comprising clock 105 and counter 106. If two like bits are received, however, the timing circuit is not reset and therefore enables gate 123 which reads out comparison checks made by AND gates 120 and 121, which latter gates are, in turn, concurrently controlled by the input and regenerated output signals. An indication of a lack of comparison is therefore passed to flip-flop 124 which energizes lamp 125.

The other check involves performing a comparison each time an input signal transition occurs. Pulser gates 130 and 132 detect the occurrence of signal transitions and, in the event that the regenerated output signal fails to check with the incoming signal prior to the transition, pulser gate 130 or 132 passes an error indication to flip-flop 131 or 133, respectively, to energize lamp 134 or 136.

Clock 105 may be a clock circuit independent of regenerator 103 or the clock circuit of regenerator 103. The only requirement in the embodiment is that clock 105 generates pulses at 100 times the signaling speed, that is, clock 105 provides 100 pulses for each signal element duration. The output of clock 105 extends to the input of counter 106. Counter 106 may comprise a binary counter which is arranged to complete a count cycle after having applied thereto 102 clock pulses by clock 105. Thereafter, upon the application of the 102nd clock pulse, counter 106 resets to the initial count condition and concurrently provides a positive transition at the output thereof which transition is passed to the input pulsing lead of gate 123. In addition, counter 106 includes an input reset terminal, as indicated in the drawing, and the application of a positive transition to this reset lead functions to restore counter 106 to the initial count condition of the counter cycle.

Flip-flop 108, which is normally in the CLEAR condition, is SET by any incoming transition received on lead 101. The input signals on lead 101 are applied to inverter 109. Inverter 109 functions to invert the signal condition, thereby providing at the output thereof the positive or high condition in response to the application of spacing signals and a low condition in response to the application of marking signals. These signals are again inverted by inverter 110, which provides a positive condition at the output thereof in response to marking signals.

The output of inverter 109 also extends to the input pulsing lead of gate 113. The input enabling lead of gate 113 is connected to the 0 output terminal of flip-flop 108. In the event that flip-flop 108 is in the CLEAR condition pulsing gate 113 is enabled and any mark-to-space transition results in the application of a positive transition through gate 113 to the set input of flip-flop 108. Accordingly, flip-flop 108 is SET in response to the reception of a mark-to-space transition.

The output of inverter 110 extends to the input pulsing lead of gate 112. The enabling lead of gate 112 is connected to the 0 output terminal of flip-flop 108 whereby gate 112 is enabled when flip-flop 108 is in the CLEAR condition. Thus, reception of a space-to-mark transition produces a positive-going condition at the output of inverter 110, which positive condition is passed by way of gate 112 to the set input of flip-flop 108. Thus, the reception of a space-to-mark transition from input lead 101 functions to SET flip-flop 108.

The SETTING of flip-flop 108 drives the 1 output terminal thereof to the positive condition. This positive condition is applied to the input enabling lead of pulsing gate 114. In addition, the 1 output terminal of flip-flop 108 is connected to the reset lead of counter 106. Accordingly, the reception of a mark-to-space or space-to-mark transition SETS flip-flop 108 and the flip-flop in turn resets counter 106 to its initial condition. In addition, pulser gate 114 is enabled, as previously described, thus passing a clock pulse therethrough to the clear input of flip-flop 108. Accordingly, flip-flop 108 is CLEARED, restoring it to its initial condition.

Summarizing the above-described operations, it is seen that clock 105 normally advances counter 102. In the event, however, that a mark-to-space or space-to-mark transition is received, flip-flop 108 is driven to the SET condition and counter 106 is reset. Accordingly, counter 106 cannot provide an output pulse to gate 123 unless a signal transition is not received for an interval which corresponds in duration to the time required to generate 102 clock pulses. Since 100 clock pulses comprises an element duration, a pulse is provided to gate 123 only in the event that the interval between transitions exceeds an element duration.

The output of counter 106 extends to the input pulsing lead of pulser gate 123 as previously described. The input enabling lead of gate 123 is connected to the output of OR gate 122 and the OR gate inputs extend to the outputs of AND gates 120 and 121.

The two inputs of AND gate 120 are connected to the outputs of inverter 110 and inverter 116 respectively. As previously described, when an incoming marking signal is received on lead 101, the output of inverter 110 goes to the positive condition. Accordingly, a positive condition is applied to one input of AND gate 120 concurrently with the reception of a marking signal.

Considering the other input lead to gate 120 which extends to inverter 116, this inverter in turn is connected to output terminal 104 of regenerator 103. When a negative spacing signal is applied by regenerator 103 to its output terminal 104, this signal is inverted by inverter 116, and the consequent high condition is applied to the other input lead of gate 120. Accordingly, both input leads to AND gate 120 are in the positive condition when an incoming marking signal is received concurrently with the production of a spacing signal at the output of regenerator 103. Thus, AND gate 120 provides a positive condition at the output thereof which condition is applied by way of OR gate 122 to the enabling lead of pulser gate 123.

Referring now to AND gate 121, one input lead thereof extends to the output of inverter 109. As previously described, when the input signal on lead 101 is spacing, inverter 109 produces a positive condition at the output thereof which positive condition is thus applied to one input of gate 121.

The other input to gate 121 is connected to the output of inverter 117 and the input to inverter 117 is coupled in turn to the output of inverter 116. Thus, when regenerator 103 produces a marking signal at the output thereof, the resultant positive condition on output terminal 104 is inverted by inverter 116 and reinverted by inverter 117 whereby a positive condition is provided to the other input lead of AND gate 121. Accordingly, both of the inputs to AND gate 121 are in the positive condition when an input spacing signal is received concurrently with the production of a marking signal at the output of regenerator 103. This results in a positive condition at the output of AND gate 121 which condition is applied by way of OR gate 122 to the enabling lead of pulser gate 123.

Summarizing the above described operations, it is seen that a positive condition is applied by one of AND gates 120 or 121 through OR gate 122 to the enabling lead of pulser gate 123 in the event that an incoming spacing signal is received concurrently with the production of a marking signal by regenerator 103 or an incoming marking signal is received concurrently with the production of a spacing signal by regenerator 103. In addition, as previously described, counter 106 provides an output pulse to gate 123 in the event that a signal transition is not received for an interval which slightly exceeds an element duration. Accordingly, assuming a transition is not received for an element duration interval and further assuming that the input signal differs from the signal produced at the output of regenerator 103 then pulser gate 123 is enabled to pass the pulse produced by counter 106 therethrough to the set input of flip-flop 124. Accordingly, flip-flop 124 is SET and the current provided at its 1 output terminal thereof is passed through lamp 125 to ground, energizing the lamp. This provides the indication of an error in the regenerator output signal since it does not compare with the incoming signal although a transition has not been received for a full element duration. After observing the error indication, the operator may reset flip-flop 124 by operation of manual contacts 126 thereby applying a positive transition to the clear input of flip-flop 124. This restores the flip-flop to the CLEAR condition de-energizing lamp 125.

Considering now pulser gates 130 and 132 which are utilized to compare the incoming transitions with the regenerator output, the input pulsing lead of pulser gate 130 extends to the output of inverter 109. As previously described, the application of a spacing signal to input lead 101 drives the output of inverter 109 to the positive condition. Accordingly, when a mark-to-space transition is received on input lead 101, a positive transition is applied to the input pulsing lead of pulser gate 130.

The enabling lead of gate 130 is connected to the output of inverter 116. Since, as previously described, regeneration of a spacing signal by regenerator 103 applies a negative condition to inverter 116, the inverter output in turn goes positive. Accordingly, a positive condition is applied to the enabling lead of pulser gate 130, and the gate is thereby enabled when a spacing condition is provided to the output of regenerator 103.

In the event that the output of regenerator 103 is providing a spacing signal and a mark-to-space transition is received on input lead 101, pulser gate 130 is enabled as described above, and a positive transition is applied to its input pulsing lead. This pulse is thus passed to the set input of flip-flop 131, driving the flip-flop to the SET condition. Accordingly, the 1 output terminal of flip-flop 131 goes to the positive condition and current is applied to ground by way of lamp 134. The consequent energization of lamp 134 indicates to the operator that a mark-to-space transition has been received while the output of regenerator 103 is spacing, thus indicating an error condition.

The input enabling lead of pulser gate 132 is connected to the output of inverter 117. As previously described, when regenerator 103 provides a marking condition to its output terminal 104, this condition is inverted by inverter 116 and reinverted by inverter 117, thereby applying a high condition to the enabling lead of pulser gate 132. Accordingly, pulser gate 132 is enabled when regenerator 103 generates a marking signal at the output thereof.

The input pulsing lead of gate 132 is connected to the output of inverter 110. As previously described, when a marking signal is received on input lead 101, the positive condition thus applied to inverter 109 is inverted and reinverted by inverter 110. Accordingly, upon the reception of the space-to-mark transition, the output of inverter 110 goes positive, and this positive transition is applied to the input pulsing lead of gate 132.

In the event that the output of regenerator 103 is marking concurrently with the reception of the space-to-mark transition, gate 132 is enabled, as previously described, and the positive transition applied to the input pulsing lead thereof is passed through gate 132 to the set input of flip-flop 133. Accrdingly, flip-flop 133 is SET and in the SET condition, the 1 output terminal thereof goes positive. This provides current to ground by way of lamp 136. The energization of lamp 136 indicates to the operator that the output of regenerator 103 is in the marking condition concurrently with the reception of a space-to-mark transition, thus indicating an error condition in the output condition of regenerator 103.

Summarizing the above described operations, it is seen that flip-flop 131 is SET energizing lamp 134 in the event that regenerator 103 is applying a spacing condition to its output terminal 104 when a mark-to-space transition is received on input lead 101, and, conversely, flip-flop 133 is SET energizing lamp 136 if the output of regenerator 103 is marking when a space-to-mark transition is received on input lead 101. Since the delay of regenerator 103 is approximately one-half the signal element, it is apparent that when a mark-to-space transition is received, regenerator 103 should concurrently be in the mark condition, the condition of input lead 101 just prior to the mark-to-space transition, and, in the event that a space-to-mark transition is received, the output of regenerator 103 should be in the space condition, the condition of input lead 101 just prior to the reception of the space-to-mark transition. Accordingly, the SETTING of either flip-flops 131 and 133 and the consequent energization of lamp 134 or 136 indicates an error condition. After observing the error condition, the operator may reset flip-flop 131 or 133 by operation of normally open manual contacts 126 thereby applying a positive transition to the clear input of flip-flops 131 or 133. This restores the flip-flop to the CLEAR condition, de-energizing lamp 134 or 136.

What is claimed is:

1. In a circuit for comparing the correspondence of a first non-return to zero binary data element train with a train having a relative delay of less than an element duration, error indicating means, a delay circuit having a delay interval exceeding an element interval, means responsive to each transition in said first train between elements having alternate ones of the binary conditions for resetting said delay circuit, means responsive to the time out of said delay circuit at the end of said delay interval for operating said error indicating means, and comparison means jointly responsive to the conditions of concurrent elements in said first train and said delayed train for controlling said operating means.

2. In a circuit for comparing the correspondence of a first binary data element train with a delayed train in accordance with claim 1 wherein said comparison means includes means responsive to the concurrent presence of an element having one of said binary conditions in said first train and an element having said corresponding one binary condition in said delayed train for disabling said operating means.

3. In a circuit for comparing the correspondence of a first binary data element train with a delayed train in accordance with claim 1 wherein said delay circuit is self resetting after said time out thereof to initiate a new delay period whereby repetitive attempts are made to operate said error indicating means in the absence of a transition in said first train.

4. In a circuit for comparing the correspondence of a first binary data element train with a delayed train in accordance with claim 1 including further means responsive to each transition in said first train between elements having either one of said binary conditions to elements having the other one of said binary conditions for operating said error detecting means, and means for enabling said further means, said enabling means being responsive to the presence of an element in said delayed train having said other binary condition concurrently with the occurrence of said transition in said first train.

References Cited

UNITED STATES PATENTS

| | | |
|---|---|---|
| 2,947,815 | 8/1960 | Baker et al. |
| 3,061,814 | 8/1962 | Crater. |
| 3,091,753 | 5/1963 | Harper. |
| 3,179,747 | 4/1965 | Grace et al. |
| 3,202,976 | 8/1965 | Rowell. |

THOMAS A. ROBINSON, *Primary Examiner.*

M. M. CURTIS, *Assistant Examiner.*

U.S. Cl. X.R.

178—70; 328—118